(12) United States Patent
Cathelain et al.

(10) Patent No.: US 8,967,549 B2
(45) Date of Patent: Mar. 3, 2015

(54) ACTUATION SYSTEM FOR LEADING EDGE HIGH-LIFT DEVICE

(75) Inventors: Francois Cathelain, Bristol (GB); Edmund Kay, Bristol (GB)

(73) Assignee: Airbus Operations Limited, Bristol (GB)

( * ) Notice: Subject to any disclaimer, the term of this patent is extended or adjusted under 35 U.S.C. 154(b) by 766 days.

(21) Appl. No.: 12/733,465

(22) PCT Filed: Oct. 27, 2008

(86) PCT No.: PCT/GB2008/050996
§ 371 (c)(1), (2), (4) Date: Mar. 3, 2010

(87) PCT Pub. No.: WO2009/056873
PCT Pub. Date: May 7, 2009

(65) Prior Publication Data
US 2010/0187368 A1  Jul. 29, 2010

(30) Foreign Application Priority Data

Oct. 31, 2007  (GB) .................................. 0721284.8

(51) Int. Cl.
*B64C 3/50* (2006.01)
*B64C 9/24* (2006.01)
*B64C 9/14* (2006.01)

(52) U.S. Cl.
CPC ............. *B64C 9/24* (2013.01); *B64C 2009/143* (2013.01); *Y02T 50/32* (2013.01)
USPC .......................................... 244/214; 244/99.3

(58) Field of Classification Search
USPC .................. 244/210, 213, 214, 99.2, 99.3
See application file for complete search history.

(56) References Cited

U.S. PATENT DOCUMENTS

| | | | |
|---|---|---|---|
| 3,089,666 A | | 5/1963 | Quenzler |
| 3,987,983 A | * | 10/1976 | Cole .............................. 244/216 |
| 4,040,579 A | * | 8/1977 | McKinney .................... 244/214 |
| 4,202,519 A | * | 5/1980 | Fletcher ........................ 244/214 |
| 4,399,970 A | * | 8/1983 | Evans ........................... 244/214 |

(Continued)

FOREIGN PATENT DOCUMENTS

| | | |
|---|---|---|
| DE | 748431 | 4/1944 |
| EP | 0 068 737 | 1/1983 |

(Continued)

OTHER PUBLICATIONS

International Search Report for PCT/GB2008/050996, mailed Mar. 5, 2009.

(Continued)

*Primary Examiner* — Timothy D Collins
*Assistant Examiner* — Keith L Dixon
(74) *Attorney, Agent, or Firm* — Nixon & Vanderhye P.C.

(57) ABSTRACT

An actuation system configured to deploy a high-lift device on a leading edge of an aircraft wing. The system comprises: a link pivotally connected to the wing at a first pivot point and to the high-lift device at a second pivot point; a first actuation mechanism configured to rotate the high-lift device about the first pivot point; and a second actuation mechanism configured to rotate the high-lift device about the second pivot point. The second actuation mechanism is operable independently of the first actuation mechanism, and can be operated in order to generate a sealing force between the high-lift device and the leading edge of the aircraft wing.

12 Claims, 2 Drawing Sheets

(56) References Cited

U.S. PATENT DOCUMENTS

| | | | |
|---|---|---|---|
| 4,470,569 A * | 9/1984 | Shaffer et al. | 244/214 |
| 4,544,117 A * | 10/1985 | Schuster | 244/210 |
| 4,585,192 A | 4/1986 | Clifford-Jones | |
| 4,915,327 A * | 4/1990 | Ellmers et al. | 244/210 |
| 5,474,265 A * | 12/1995 | Capbern et al. | 244/214 |
| 5,927,656 A | 7/1999 | Hinkleman | |
| 6,286,790 B1 * | 9/2001 | Thorpe | 244/214 |
| 7,264,206 B2 * | 9/2007 | Wheaton et al. | 244/214 |
| 7,270,305 B2 * | 9/2007 | Rampton et al. | 244/214 |
| 2008/0265089 A1 | 10/2008 | Zeumer | |

FOREIGN PATENT DOCUMENTS

| | | |
|---|---|---|
| EP | 1 607 324 | 12/2005 |
| GB | 410375 | 5/1934 |
| GB | 2 010 761 | 7/1979 |
| GB | 2 038 737 | 7/1980 |
| GB | 2 137 569 | 10/1984 |
| WO | WO 2005/108205 | 11/2005 |

OTHER PUBLICATIONS

Written Opinion of the International Searching Authority for PCT/GB2008/050996, mailed Mar. 5, 2009.

UK Search Report for GB 0721284.8, dated Feb. 17, 2008.

Translation of Chinese Office Action issued Jul. 23, 2012 in CN 2008801144489.

Japanese Office Action issued Apr. 2, 2013 in JP 2010-531587.

* cited by examiner

ACTUATION SYSTEM FOR LEADING EDGE HIGH-LIFT DEVICE

This application is the U.S. national phase of International Application No. PCT/GB2008/050996 filed 27 Oct. 2008, which designated the U.S. and claims priority to GB Application No. 0721284.8 filed 31 Oct. 2007, the entire contents of each of which are hereby incorporated by reference.

FIELD OF THE INVENTION

The present invention relates to a method and actuation system for deploying a high-lift device on a leading edge of an aircraft wing.

BACKGROUND OF THE INVENTION

Modern aircraft require greater performance from their high lift devices while trying to minimise their structure and system impact. High lift systems need to provide a high lift to drag ratio during take-off, while achieving maximum lift and therefore maximum angle of attack at landing.

Associated with the performance constraints are structure and system requirements that are driving the design toward simpler, lighter and more compact devices.

Interference between high lift leading edge devices and internal structure (such as the front spar) and external structure (such as the engine nacelle and thrust reverser) needs to be avoided.

Conventional leading edge high lift devices are described in WO 2005/108205 A1 and U.S. Pat. No. 5,927,656. In WO 2005/108205 A1 the device is rotated about an axle between a stowed position and a deployed position. In the stowed position the device is sealed against the fixed leading edge of the wing, and in the deployed position a slot is formed between these elements. U.S. Pat. No. 5,927,656 describes a similar arrangement, although in this case the flap can also be deployed to an intermediate position in which there is little or no gap between the trailing edge of the device and the fixed leading edge.

A problem with these conventional arrangements is that only a simple rotation is possible. Therefore it is difficult to optimise position of the device in its various positions. A conventional approach to providing a more complex motion is to mount the device on a curved track, as described for example in U.S. Pat. No. 4,399,970. However such track mechanisms are complex, heavy, and take up a large amount of space.

SUMMARY OF THE INVENTION

A first aspect of the invention provides an actuation system configured to deploy a high-lift device on a leading edge of an aircraft wing, the system comprising:
- a link pivotally connected to the wing at a first pivot point and to the high-lift device at a second pivot point;
- a first actuation mechanism configured to rotate the high-lift device about the first pivot point in order to move the high-lift device downward around the leading edge from a stowage position to an intermediate position; and
- a second actuation mechanism configured to rotate the high-lift device about the second pivot point, wherein the second actuation mechanism is operable in order to move the high-lift device from the intermediate position to a fully extended position, and operable when the high-lift device is in the stowage position and/or the intermediate position in order to generate a sealing force between the high-lift device and the leading edge of the aircraft wing.

A second aspect of the invention provides a method of deploying a high-lift device on a leading edge of an aircraft wing, using the actuation system of the first aspect of the invention. The method comprises: rotating the high-lift device about the first pivot point by operation of at least the first actuation mechanism in order to move the high-lift device downward around the leading edge from a stowage position to an intermediate position; rotating the high-lift device about the second pivot point by operation of at least the second actuation mechanism in order to move the high-lift device from the intermediate position to a fully extended position; and operating the second actuation mechanism when the high-lift device is in the stowage position and/or the intermediate position in order to generate a sealing force between the high-lift device and the leading edge of the aircraft wing.

The present invention provides an actuation system which can impart a more complex motion to the device without incurring the disadvantages of a track mechanism. The high-lift device moves around the leading edge from the stowage position to the intermediate position with a downward drooping motion. The second actuation mechanism can then move the high-lift device from the intermediate position to a fully extended position, typically opening up a slot between the high-lift mechanism and the leading edge as it does so. The second actuation mechanism can also be operated to generate a sealing force between the high-lift device and the leading edge of the aircraft wing either in the stowage position, in the intermediate position, or in both positions.

The first and second actuation mechanisms may both be driven by a single actuator, creating a dependent motion between the two mechanisms. However more preferably the second actuation mechanism is operable independently of the first actuation mechanism. In this case the first actuation system typically comprises a first actuator having a first control input for receiving a first control signal; and the second actuation system comprises a second actuator having a second control input for receiving a second control signal. Thus the actuators can be operated independently by means of their respective control signals.

The first actuation mechanism may comprise a rotary actuator with a drive axle which is coaxial with the first pivot point. However more preferably the first actuation mechanism is pivotally connected to the link on one hand, and pivotally connected to the wing on the other hand. The first actuation mechanism may comprise a linear actuator, or a rotary actuator connected to the link by a pair of hinged drive arms.

Similarly the second actuation mechanism may comprise a rotary actuator with a drive axle which is coaxial with the second pivot point. However more preferably the second actuation mechanism is pivotally connected to the link or the wing on the one hand, and pivotally connected to the high-lift device on the other hand. The second actuation mechanism may comprise a linear actuator, or a rotary actuator connected to the link by a pair of hinged drive arms.

Typically the high-lift device engages the leading edge of the wing when the high-lift device is in the intermediate position. In this case the second actuation mechanism may be operated in order to generate a sealing force between the high-lift device and the leading edge. However this positive sealing action is not essential, and a small gap may be present at the intermediate position.

Preferably the second actuation mechanism is operable when the high-lift device is in both the stowage position and the intermediate position in order to generate a sealing force between the high-lift device and the leading edge of the aircraft wing. The second actuation mechanism may also be operable in order to press the high-lift device against the leading edge of the aircraft wing as it moves downward around the leading edge from the stowage position to the intermediate position.

Various other preferred aspects of the invention are set out in the dependent claims.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
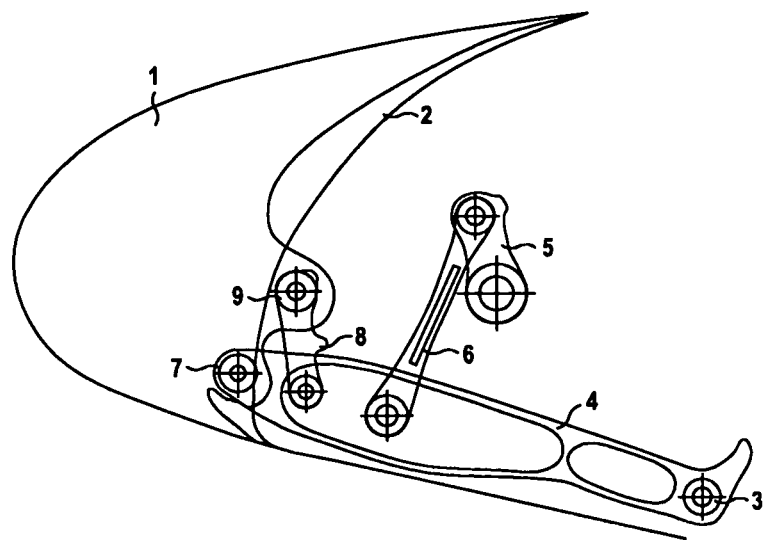
FIG. 1 is a sectional view of a leading edge flap in a stowage (cruise) position.
Figure 2:
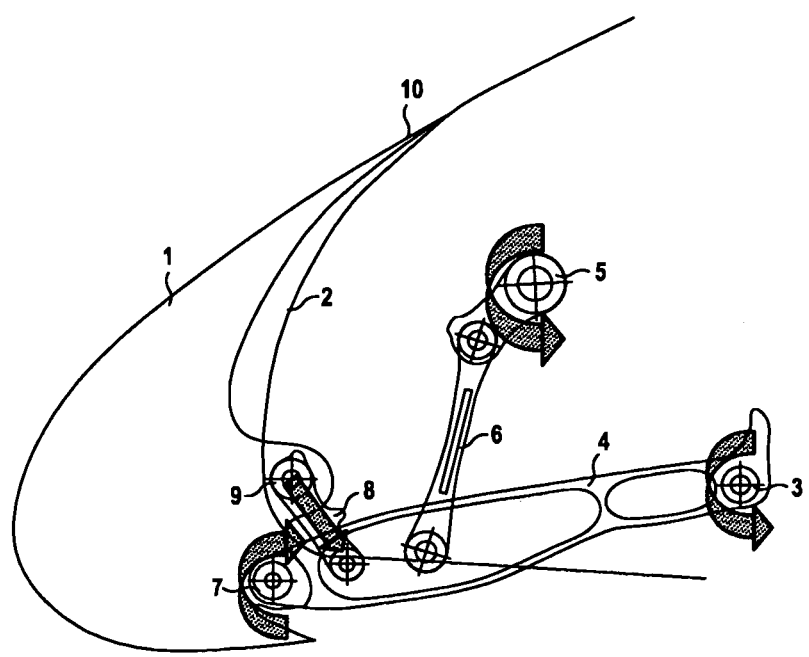
FIG. 2 shows the flap in an intermediate (take off) position.
Figure 3:
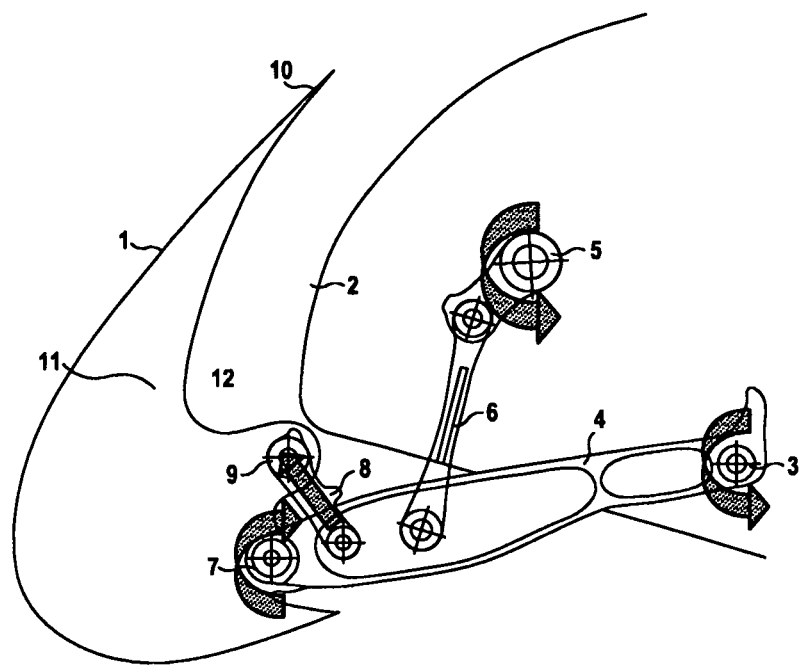
FIG. 3 shows the flap in a fully extended (landing) position.

FIGS. 1-3 show a leading edge flap 1. The flap 1 is designed to improve the aircraft lift to drag ratio in the take-off phase and increase the maximum angle of attack of the aircraft thus delaying wing stall in the landing phase. FIG. 1 shows the leading edge flap in a fully retracted stowage position; FIG. 2 shows the flap in an intermediate position for maximum lift to drag ratio in take-off; and FIG. 3 shows the flap in a fully extended position for maximum aircraft angle of attack in landing.

As shown in FIG. 1, the leading edge flap 1 is mounted on a fixed leading edge 2 of the wing. The leading edge flap actuation system comprises a link 4 pivotally connected to the wing at a first pivot point 3 and to the flap at a second pivot point 7. The link 4 can be rotated about the first pivot point 3 by a first actuation mechanism comprising a rotary actuator 5 and a pair of hinged drive arms 6. The flap 1 can also be rotated about the second pivot point 7 by a second actuation mechanism. The second actuation mechanism comprises a linear actuator 8 which is pivotally connected to the link 4 at a third pivot point (not labelled) and to the flap at a fourth pivot point 9.

Figure 4:
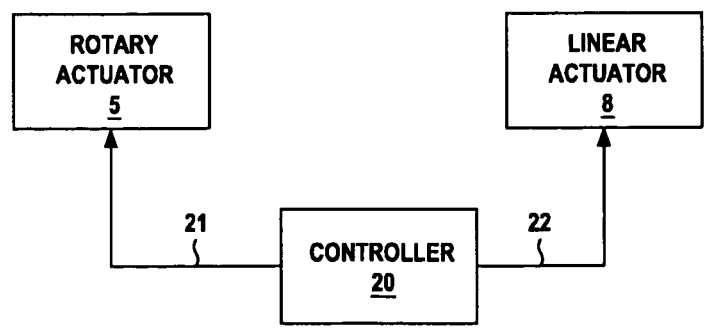
FIG. 4 is a schematic view of the actuator control system.

Note that the linear actuator 8 is operable independently of the rotary actuator 5. FIG. 4 is a schematic view of the electrical system for controlling the actuators. A controller 20 generates respective control signals which are used to operate the actuators 5,8 via respective control inputs 21,22.

The flap is deployed in two phases. In the first phase (FIG. 2) the rotary actuator 5 is driven anticlockwise to rotate the flap around the first pivot point 3. In the second phase (FIG. 3) the linear actuator 8 is extended to rotate the flap around the second pivot point 7.

In cruise, the flap is retracted to form the leading edge contour of the wing as shown in FIG. 1. In this position, the upper and lower trailing edges of the flap are in line with the fixed wing profile and the first pivot point 3 is below the second pivot point 7.

In the intermediate (take-off) configuration shown in FIG. 2, the flap is deployed by the rotary actuator 5, in this example by an angle of 15 degrees. The resultant droop of the leading edge of the wing reduces the leading suction pressure peak especially at high incidences by reducing the angle that the free stream flow must be turned onto the upper surface, hence reducing the acceleration of the flow and the minimum pressure experienced at the peak.

Preferably a seal is formed between the flap 1 and the wing fixed leading edge 2 in the intermediate position of FIG. 2 in order to reduce the drag increase compared with a slotted slat, and to maximise the lift to drag ratio and therefore the take-off performance.

Because of manufacturing tolerances and the deformation due to the aerodynamic loads experienced by the flap 1 and the wing fixed leading edge 2, perfect sealing is often difficult to achieve. Therefore the linear actuator 8 can be operated as shown in FIG. 2 in order to generate a positive sealing force between the upper trailing edge of the leading edge flap 10 and the leading edge of the aircraft wing 2. That is, as the flap is deployed from the stowage position (FIG. 1) to the intermediate position (FIG. 2) a control signal is sent to the linear actuator 8 which causes it to bias the flap in a clockwise direction around the second pivot point 7 thus achieving a strong seal between the flap and the leading edge 2. This enhances the performance of the flap compared to a conventional drooped leading edge flap with a single actuation mechanism.

A seal is also formed between the flap 1 and the leading edge 2 when the flap is in the stowage position of FIG. 1. This seal is maintained in the stowage position in a similar manner, that is by operating the linear actuator 8 to force the flap against the leading edge 2 of the aircraft wing.

As the flap moves between the stowage and intermediate positions, the controller continues to operate the linear actuator so as to resist expansion of the linear actuator, thus pressing the flap against the leading edge as it moves.

To move to the fully extended (landing) configuration of FIG. 3, the flap is deployed using both actuation mechanisms. That is, the rotary actuator 5 rotates the link 4 further downward around the first pivot point 3, in this example to an angle of 25 degrees. At the same time the linear actuator 8 is expanded to rotate the leading flap around the secondary pivot point 7, moving the upper trailing edge 10 of the leading edge flap anticlockwise away from the fixed leading edge 7. Note that the linear actuator 8 is operated in FIG. 3 in an opposite direction to that shown in FIG. 2.

This anticlockwise rotation about the second pivot point 7, combined with the appropriate shape of the fixed leading edge 2 and the back skin 11 of the leading edge flap, releases the seal and forms a slot 12 which allows air to flow through the slot and exit onto an upper surface of the fixed leading edge 2. The slot 12 is convergent approaching the upper trailing edge 10 of the flap, allowing a significant acceleration of the flow on the upper surface of the fixed leading edge 2. Opening the slot 12 allows the flap to work as a slat. The circulation around the flap 1 induces velocities that counter the velocities developing on the fixed leading edge 2 (due to the circulation around this isolated element). This has the effect of reducing the suction peak on the main wing. In reducing the suction peak the boundary layer is more able to negotiate the reduced pressure gradient and alleviate flow breakdown which would result in separation on the wing upper surface.

In summary, the preferred embodiment of the invention described above is an innovative high lift leading edge system composed of a leading edge flap, a fixed wing leading edge and two actuation systems based on rotations around two pivot points. The first actuation rotates the leading edge flap around the fixed wing leading edge creating a droop effect. The second actuation, combined with the contour of the wing fixed leading edge, rotates the leading edge flap trailing edge away from the wing fixed leading edge to open a slot. For take off settings only the first actuation is applied to benefit from the droop effect reducing the leading edge suction peak and therefore delaying the wing stall. Nevertheless, the drag rise is minimised by avoiding any slot between the leading edge flap and the wing fixed leading edge. For the landing settings further droop is applied with the first actuation in combination with a second actuation. This opens a slot between the wing fixed leading edge and slat trailing edge allowing energised airflow into the boundary layer of the upper wing surface with the result of further delaying wing stall.

The device is not a conventional slat or sealed slat as it is not deployed on a constant arc radius track. It is an adaptation of a drooped leading edge flap design. The device uses, in addition to an initial deployment around a hinge point, a second actuation coupled with the shape of the wing fixed leading edge to open a slot in the landing setting. The vented setting provides additional stall protection in landing while maintaining the sealed setting in take-off for low drag. This combines the low drag performance and compact hinge arm actuation of a drooped leading edge flap with the optimum stall protection of a slat.

The double-actuation mechanism enables the fixed leading edge to have a relatively low curvature, thus providing an improved pressure distribution particularly in the fully extended landing setting.

Although the invention has been described above with reference to one or more preferred embodiments, it will be appreciated that various changes or modifications may be made without departing from the scope of the invention as defined in the appended claims.

For instance the active linear actuator 8 may be replaced by a passive multi-link drive mechanism which rotates the flap in two directions about the second pivot point 7 by a dependent motion. In this case both phases of motion can be driven by only a single actuator—that is the rotary actuator 5.

Also, in the intermediate position a small slot may be permitted to open up, although this is less preferred for the reasons given above.

The invention claimed is:

1. An actuation system configured to deploy a high-lift device on a leading edge of an aircraft wing, the system comprising:
   a. a link pivotally connected to the wing at a first pivot point and to the high-lift device at a second pivot point;
   b. a first actuation mechanism configured to rotate the high-lift device about the first pivot point in order to move the high-lift device downward around the leading edge from a stowage position to an intermediate position; and
   c. a second actuation mechanism configured to rotate the high-lift device about the second pivot point,
   wherein the second actuation mechanism is configured to operate independently of said first actuation mechanism when the high-lift device is in both the stowage position and the intermediate position, to generate a sealing force between the high-lift device and the leading edge of the aircraft wing, and is configured to release said sealing force to move the high-lift device from the intermediate position to a fully extended position, said fully extended position including a slot between said high-lift device and said leading edge of said wing.

2. The system of claim 1 wherein the first actuation system comprises a first actuator having a first control input for receiving a first control signal; and the second actuation system comprises a second actuator having a second control input for receiving a second control signal.

3. The system of claim 1 wherein the second actuation mechanism is configured to move the high-lift device in a first direction from the intermediate position to the fully extended position, and to move the high-lift device in a second direction to generate a sealing force between the high-lift device and the leading edge of the aircraft wing.

4. The system of claim 1 wherein the second actuation mechanism is pivotally connected to the link or the wing, and pivotally connected to the high-lift device.

5. The system of claim 1 wherein the first pivot point is below the second pivot point in at least one position of the high-lift device.

6. The system of claim 1, wherein the system is configured to rotate the high-lift device at least about the first pivot point in order to move the high-lift device from a stowage position to an intermediate position in which the high-lift device engages the leading edge of the aircraft wing; and further configured to rotate the high-lift device at least about the second pivot point in order to move the high-lift device from the intermediate position to a fully extended position.

7. A method of deploying a high-lift device on a leading edge of an aircraft wing, using the actuation system of claim 1, the method comprising the steps of:
   a. rotating the high-lift device about the first pivot point by operation of said at least a first actuation mechanism in order to move the high-lift device downward around the leading edge from said stowage position to said intermediate position and providing a sealing force between the high-lift device and the leading edge by operation of said at least a second actuation mechanism in both said stowage position and said intermediate position;
   b. rotating the high-lift device about the second pivot point by operation of said at least a second actuation mechanism releasing said sealing force and moving the high-lift device from the intermediate position to said fully extended position creating said slot.

8. The method of claim 7 wherein the second actuation mechanism is operated in a first direction in order to move the high-lift device from the intermediate position to a fully extended position, and in a second direction in order to generate a sealing force between the high-lift device and the leading edge of the aircraft wing.

9. The method of claim 7 further comprising the step of operating the first actuation mechanism simultaneously with the second actuation mechanism.

10. The method of claim 7 further comprising the step of allowing air to flow through the slot and exit onto an upper surface of the wing when the high-lift device is in the fully extended position.

11. The method of claim 7 further comprising the step of operating the second actuation mechanism in order to press the high-lift device against the leading edge of the aircraft wing as it moves downward around the leading edge from the stowage position to the intermediate position.

12. An actuation system according to claim 1, wherein the high-lift device forms a leading edge contour of the wing when in said stowage position.

* * * * *